(12) United States Patent
Orcutt (10) Patent No.: US 10,955,726 B2
(45) Date of Patent: Mar. 23, 2021

(54) INTRACAVITY GRATING TO SUPPRESS SINGLE ORDER OF RING RESONATOR

(71) Applicant: International Business Machines Corporation, Armonk, NY (US)

(72) Inventor: Jason S. Orcutt, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/541,392

(22) Filed: Aug. 15, 2019

(65) Prior Publication Data

US 2021/0048726 A1 Feb. 18, 2021

(51) Int. Cl.
*G02F 1/35* (2006.01)
*G02B 6/293* (2006.01)

(52) U.S. Cl.
CPC ......... *G02F 1/353* (2013.01); *G02B 6/29335* (2013.01); *G02F 2203/15* (2013.01)

(58) Field of Classification Search
CPC .. G02B 6/29335; G02F 1/353; G02F 2203/15
See application file for complete search history.

(56) References Cited

U.S. PATENT DOCUMENTS

| | | | |
|---|---|---|---|
| 4,397,025 A | 8/1983 | Kebabian | |
| 7,376,309 B2 * | 5/2008 | Gulde | G02B 6/12007 372/102 |
| 7,406,226 B1 * | 7/2008 | Horst | G02B 6/12007 372/94 |
| 7,480,425 B2 * | 1/2009 | Gunn | G02B 6/12007 385/14 |
| 7,929,589 B1 * | 4/2011 | Ilchenko | G02B 6/29341 372/67 |
| 8,331,008 B1 | 12/2012 | Matsko et al. | |
| 8,571,075 B2 | 10/2013 | Fermann et al. | |
| 9,260,289 B2 | 2/2016 | Park | |
| 9,268,195 B1 | 2/2016 | Camacho | |

(Continued)

FOREIGN PATENT DOCUMENTS

| CN | 103091871 A | 5/2013 |
|---|---|---|
| CN | 109946515 A | 6/2019 |

OTHER PUBLICATIONS

Rueda et al., "Efficient microwave to optical photon conversion: an electro-optical realization," Optica, vol. 3, No. 6, pp. 597-604 (Jun. 2016).

(Continued)

*Primary Examiner* — Daniel Petkovsek
(74) *Attorney, Agent, or Firm* — Keivan Razavi; Michael J. Chang, LLC (57) ABSTRACT

Microwave-to-optical transducers in an optical ring resonator having intracavity grating to split a single resonance order are provided. In one aspect, a microwave-to-optical transducer includes: an optical ring resonator with intracavity grating; and a microwave signal waveguide optically coupled to the optical ring resonator with the intracavity grating. Microwave-to-optical transducers having multiple pump photon optical ring resonators and multiple signal photon optical ring resonators optically coupled to the optical ring resonator with the intracavity grating are also provided, as is a method of forming a microwave-to-optical transducer, and a method for microwave-optical transduction.

16 Claims, 9 Drawing Sheets

(56) References Cited

U.S. PATENT DOCUMENTS

| | | | |
|---|---|---|---|
| 9,316,787 B1 | 4/2016 | Orcutt et al. | |
| 9,350,460 B2 | 5/2016 | Paik | |
| 9,857,609 B2 | 1/2018 | Bishop et al. | |
| 10,451,806 B1* | 10/2019 | Puckett | G02B 6/29323 |
| 2005/0175358 A1* | 8/2005 | Ilchenko | H04B 10/60 |
| | | | 398/198 |
| 2009/0097516 A1 | 4/2009 | Maleki et al. | |
| 2009/0135860 A1 | 5/2009 | Maleki et al. | |
| 2012/0063484 A1* | 3/2012 | Goddard | H01S 5/142 |
| | | | 372/94 |
| 2017/0227795 A1 | 8/2017 | Bishop et al. | |
| 2017/0248832 A1* | 8/2017 | Kippenberg | G02F 1/365 |
| 2018/0233877 A1 | 8/2018 | Udem et al. | |

OTHER PUBLICATIONS

Mankei Tsang, "Cavity quantum electro-optics," Physical Review A, vol. 81, No. 6, Jun. 2010, 063837 (5 pages).

Mian Zhang et al., "Electronically Programmable Photonic Molecule," arXiv preprint arXiv:1809.08638, Sep. 2018 (12 pages).

Jeremy D. Witmer et al., "High-Q photonic resonators and electro-optic coupling using silicon-on-lithium-niobate," Scientific Reports, vol. 7, Apr. 2017, 46313 (7 pages).

Clement Javerzac-Galy et al., "On-chip microwave-to-optical quantum coherent converter based on a superconducting resonator coupled to an electro-optic microresonator," arXiv:1512.06442v2, Aug. 2016 (5 pages).

International Search Report and Written Opinion for PCT/IB2020/057214 dated Nov. 20, 2020 (11 pages).

* cited by examiner

INTRACAVITY GRATING TO SUPPRESS SINGLE ORDER OF RING RESONATOR

FIELD OF THE INVENTION

The present invention relates to microwave-optical transducers, and more particularly, to microwave-optical transducers in an optical ring resonator having intracavity grating to suppress a single resonance order by modal splitting or excess loss thereby permitting conversion of microwave signals to optical signals at peak efficiency.

BACKGROUND OF THE INVENTION

The ability to link microwave electrical signals and optical photons for quantum information processing requires efficient conversion between the microwave and optical domains. A microwave-to-optical transducer can be employed for this conversion. The transducer can include an optical ring resonator.

Microwave-to-optical transducers in optical ring resonator structures need to couple a microwave photon between two optical resonance orders. However, for a given pump photon frequency, there are generally both blue-detuned and red-detuned resonances that could be coupled to. In the quantum domain, this would result in a 50% maximum efficiency to a single resonance.

Therefore, techniques that suppress the microwave to optical signal conversion to the undesired resonance order in optical ring transducers would be desirable.

SUMMARY OF THE INVENTION

The present invention provides microwave-optical transducers in an optical ring resonator having intracavity grating to split a single resonance order thereby permitting conversion of microwave to optical signals at peak efficiency. In one aspect of the invention, a microwave-to-optical transducer is provided. The microwave-to-optical transducer includes: an optical ring resonator with intracavity grating; and a microwave signal waveguide optically coupled to the optical ring resonator with the intracavity grating.

In another aspect of the invention, another microwave-to-optical transducer is provided. The microwave-to-optical transducer includes: an optical ring resonator with intracavity grating having a core, and an evanescent feature adjacent to the core; a microwave signal waveguide optically coupled to the optical ring resonator with the intracavity grating; multiple pump photon optical ring resonators optically coupled to the optical ring resonator with the intracavity grating forming an isolated pump photon pathway; and multiple signal photon optical ring resonators optically coupled to the optical ring resonator with the intracavity grating forming an isolated signal photon pathway.

In yet another aspect of the invention, a method of forming a microwave-to-optical transducer is provided. The method includes: providing a first Si layer on a substrate; patterning the first Si layer to form a patterned portion of the first Si layer having a shape of an optical ring resonator on the substrate; depositing a SiGe layer onto the substrate over the patterned portion of the first Si layer; patterning the SiGe layer into a core and an evanescent feature adjacent to the core, wherein the evanescent feature includes a base portion, and a width modulation portion having a width that modulates continuously along a surface of the base portion facing the core to form intracavity grating; depositing a second Si layer onto the substrate over the core and the evanescent feature adjacent to the core; and patterning the second Si layer to form a patterned portion of the second Si layer that surrounds the core and the evanescent feature adjacent to the core.

In still yet another aspect of the invention, a method for microwave-optical transduction is provided. The method includes: providing a microwave-to-optical transducer including an optical ring resonator with intracavity grating, and a microwave signal waveguide optically coupled to the optical ring resonator with the intracavity grating; providing optical pump photons at a frequency $f_P$ to the optical ring resonator with the intracavity grating, wherein there are two optical resonances relative to the optical pump photon frequency ($f_P$), and wherein the intracavity grating spoils one of the two optical resonances; providing microwave input photons of frequency $f_{RF}$ to the optical ring resonator with the intracavity grating via the microwave signal waveguide; and converting the optical pump input photons at the frequency $f_P$ to an output signal at a frequency $f_S$, wherein $f_S = f_P - f_{RF}$.

A more complete understanding of the present invention, as well as further features and advantages of the present invention, will be obtained by reference to the following detailed description and drawings.

BRIEF DESCRIPTION OF THE DRAWINGS

FIG. 9 is a top-down diagram illustrating that the width modulation portion forms the intracavity grating that is continuous along a side of the base portion (i.e., inner ring)

adjacent to the core (i.e., outer ring) of the optical ring resonator according to an embodiment of the present invention;

DETAILED DESCRIPTION OF PREFERRED EMBODIMENTS

Microwave-to-optical transduction by way of the electro-optic effect can be achieved using an optical ring resonator structure in which a microwave resonator is formed to spatially overlap the radio frequency (RF) and optical modes. Microwave frequencies generally refer to those RF frequencies of greater than or equal to about 1 gigahertz (GHz). As provided above, the optical ring resonators couple a microwave photon of frequency $f_{RF}$ between two optical resonance orders, e.g., a frequency of an optical pump ($f_P$) and a frequency of the output optical signal ($f_S$). See, for example, FIG. 1.

Figure 1:
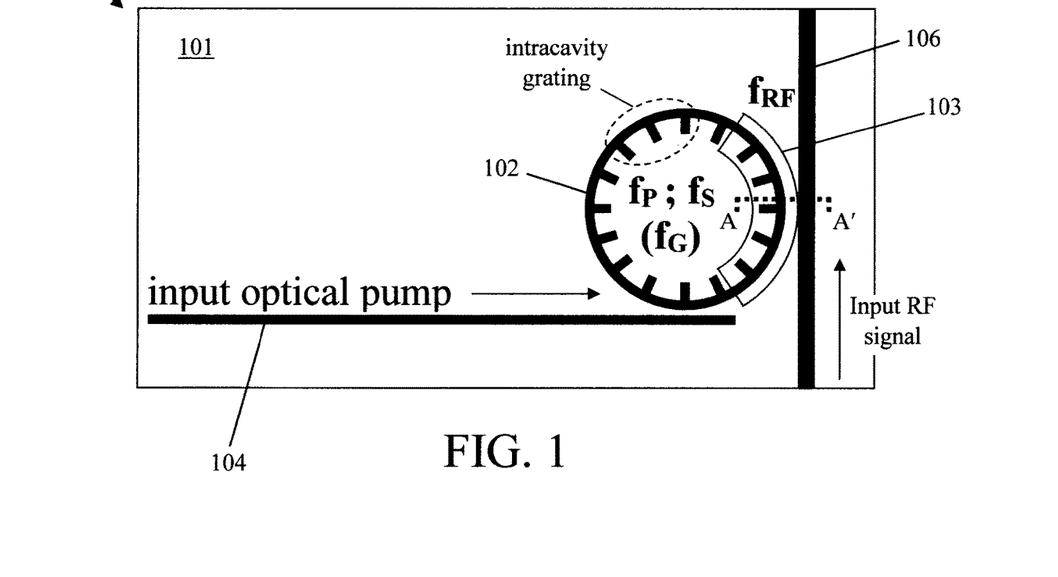
FIG. 1 is a top-down diagram illustrating a microwave-to-optical transducer having a single optical ring resonator with intracavity grating, an input pump photon waveguide, and a microwave signal waveguide on a substrate according to an embodiment of the present invention.

FIG. 1 illustrates a microwave-to-optical transducer 100 having a single optical ring resonator 102 on a substrate 101. The microwave-to-optical transducer 100 configuration shown in FIG. 1 is merely an example, as transducer designs having multiple optical ring resonators are described in detail below. Referring to FIG. 1, optical ring resonator 102 is waveguide in the shape of a closed loop optical ring. As will be described in detail below, each of the waveguides employed herein generally includes a core formed from a first material that is surrounded by a second/different material of a lower refractive index. Namely, the material used for the core has a higher refractive index than the material that surrounds it, such that the waveguide provides primary modal index guiding. By way of example only, suitable materials for the waveguide include but are not limited to, silicon germanium (SiGe) as the first material for the core and silicon (Si) as the second material surrounding the core.

A top electrode 103 is present over at least a portion of the optical ring resonator 102. For instance, according to an exemplary embodiment, top electrode 103 has a crescent shape that covers a portion of the optical ring resonator 102 forming a quarter-wave RF resonator which provides close integration of the top electrode 103 with the optical ring resonator 102.

Optical ring resonator 102 is optically coupled to an input pump photon waveguide 104. As shown in FIG. 1, input pump photon waveguide 104 carries optical pump input photons at a frequency $f_P$ to the optical ring resonator 102. As is known in the art, optical pumping involves coupling the emission of a narrow-linewidth laser into the optical pump waveguide to establish a circulating optical pump mode excitation in the optical ring resonator 102 with, for example, between 100,000 and 10,000,000 mean photon number at frequency $f_P$. A microwave signal waveguide 106 is also optically coupled to optical ring resonator 102. Microwave signal waveguide 106 carries microwave input photons of frequency $f_{RF}$ to the optical ring resonator 102. As provided above, like optical ring resonator 102 (and any of the other waveguides employed herein), input pump photon waveguide 104 and microwave signal waveguide 106 each generally include a core formed from a first material (e.g., SiGe) that is surrounded by a second/different material of a lower refractive index (e.g., Si).

Optical ring resonator 102 serves to couple the optical pump input photons carried by the input pump photon waveguide 104 and the microwave photons carried by the microwave signal waveguide 106 to convert the optical pump photon input signals ($f_P$) to an output signal at frequency ($f_S$), wherein $f_S=f_P-f_{RF}$. To do so, the optical free spectral range of the optical ring resonator 102 and the input RF frequency ($f_{RF}$) need to go to a single resonance in order to be matched. However, as highlighted above, for a given pump photon frequency $f_P$, there are generally both blue-detuned and red-detuned resonances (also referred to herein as "blue-side" and "red-side" resonances, respectively) that the optical pump input photons could be coupled to. As generally known in the art, 'blue-detuned' refers to a frequency above the resonant frequency, and 'red-detuned' refers to a frequency below the resonant frequency. With both resonances present to couple to, the $f_P \rightarrow f_S$ conversion efficiency to a single resonance order is at best 50%.

Advantageously, provided herein are techniques for suppressing the microwave-to-optical signal conversion to the undesired resonance order using intracavity grating (see FIG. 1) to suppress the single resonance by splitting or spoiling the resonance at the unused resonance order. According to an exemplary embodiment, $f_G$ corresponds to the first order Bragg condition of the grating to introduce a reflection that couples clockwise and counterclockwise propagating modes to split the resonance modes at this frequency. In another exemplary embodiment, $f_G$ corresponds to the approximate second order Bragg condition of the intracavity grating to introduce radiative loss that spoils the resonance at this frequency. For instance, according to an exemplary embodiment, the unused resonance order is the blue-side resonance at frequency $f_G$, wherein $f_G=f_P+f_{RF}$. Thus, the blue-side resonance at $f_G$ is suppressed by the intracavity grating such that the conversion process from $f_P \rightarrow f_S$ dominates.

Figure 2:
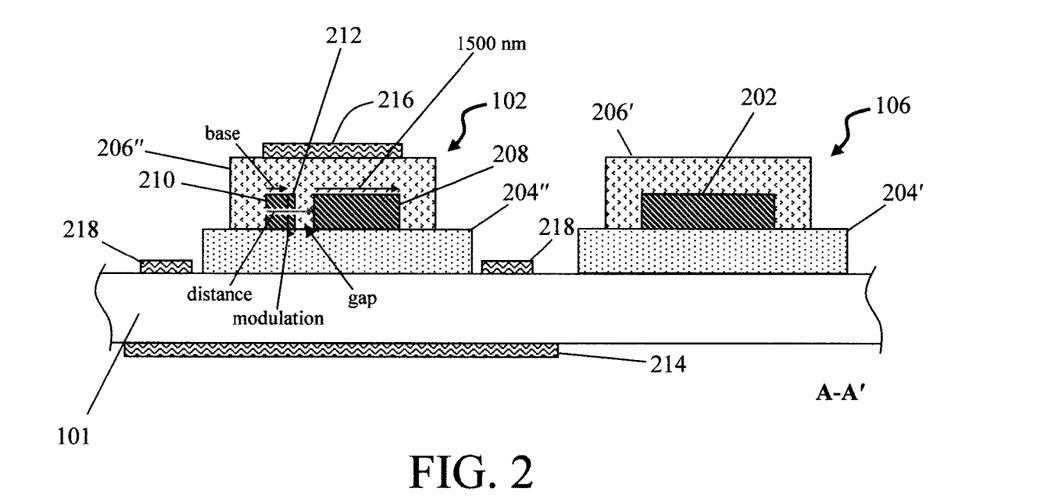
FIG. 2 is a cross-sectional diagram of the optical ring resonator with intracavity grating (formed by an evanescent feature, adjacent to a core, having a base portion and a width modulation portion) and microwave signal waveguide of FIG. 1 according to an embodiment of the present invention.

FIG. 2 is a cross-sectional diagram illustrating a cut through line A-A' (see FIG. 1). Sections of both the optical ring resonator 102 and microwave signal waveguide 106 are visible in this view. As shown in FIG. 2, both the optical ring resonator 102 and the microwave signal waveguide 106 (as well as the input pump photon waveguide 104, although not visible in this depiction) are each a waveguide structure having a core formed from a first material that is surrounded by a second/different material of a lower refractive index. With the optical ring resonator 102, however, an evanescent feature having width modulation to form the intracavity grating is patterned in the same layer as the core. No such grating is present in the input pump photon/microwave signal waveguides 104/106.

As shown in FIG. 2, the optical ring resonator 102 and microwave signal waveguide 106 (as well as the input pump photon waveguide 104, although not visible in this depiction) are each disposed on a substrate 101. According to an exemplary embodiment, substrate 101 is a low refractive index material. By 'low refractive index' it is meant that the substrate 101 has a refractive index that is less than the refractive index of silicon (Si). By way of example only, suitable low refractive index materials include, but are not limited to, sapphire, diamond, silicon carbide (SiC) and/or gallium nitride (GaN). For instance, in one exemplary embodiment, the optical ring resonator 102, input pump photon waveguide 104, and microwave signal waveguide 106 are formed in a silicon-on-X (SOX) substrate, where X denotes the low refractive index material (e.g., sapphire, diamond, SiC and/or GaN) of substrate 101. Substrates like this that are made up of multiple materials are also referred to herein as structured substrates. Use of a low refractive index substrate 101 under the optical ring resonator 102, input pump photon waveguide 104, and microwave signal waveguide 106 serves to truncate the evanescent optical field and minimize radiation loss.

Referring first to microwave signal waveguide 106, as shown in FIG. 2 microwave signal waveguide 106 includes a core 202 surrounded by Si (i.e., Si layers 204' and 206'). Using the example provided above of an SOX structured substrate, Si layer 204' is a patterned portion of the Si layer on the, e.g., sapphire, diamond, SiC and/or GaN, substrate 101 (see below). Patterning is used form the core 202 on the Si layer 204', after which Si layer 206' is deposited over the core 202 such that the core 202 is surrounded by the Si layers 204' and 206'. The material(s) surrounding the core in a waveguide may also be referred to herein generally as a 'cladding' material. An exemplary methodology for forming the present waveguide devices is described in detail below. As highlighted above, the core 202 is formed from a material having a refractive index that is higher than the refractive index of the cladding material surrounding the core 202. When the core 202 is surrounded by Si (i.e., Si layers 204' and 206'), suitable materials for core 202 include, but are not limited to, silicon germanium (SiGe). A SiGe core/Si cladding provides primary modal index guiding. Although not visible in FIG. 2, these same details apply to input pump photon waveguide 104.

On the other hand, while optical ring resonator 102 contains a (e.g., SiGe) core 208 surrounded by Si layers 204" and 206", an evanescent feature having width modulation to form the intracavity grating is also patterned in the same layer as core 208. The designations 204" and 206" are used to indicate that, according to an exemplary embodiment, these Si layers 204" and 206" are patterned portions of the same respective layers as Si layers 204' and 206'. This distinction will be apparent in the fabrication process flow described below. Since the evanescent feature is patterned in the same layer as core 208, it too will be formed from the same material as the core, e.g., SiGe.

Other configurations are also contemplated herein. For instance, in another exemplary embodiment, substrate 101 is formed from the same material as the cladding. In that case, optical confinement is fully established by the higher refractive index material of core 202, such as SiGe, as compared to (Si) substrate 101, and Si layers 204'/204" and 206'/206".

As shown in FIG. 2, the evanescent feature is formed adjacent to the core 208 and includes a base portion 210 and a width modulation portion 212. As its name implies, the width modulation portion has a width that modulates continuously along the surface of the base portion 210 facing the core, e.g., forming a sawtooth pattern—see below. This pattern is what is referred to herein as the 'intracavity grating.' It is notable that what is shown in FIG. 2 is a cross-section of optical ring resonator 102 is a ring structure. Thus, the base portion 210 may be thought of as the inner ring structure, and core 208 the outer ring structure. Further, while this example depicts the evanescent feature and hence intracavity grating along the inner ring, embodiments are also contemplated herein where the evanescent feature with intracavity grating is instead present along an outer ring (e.g., where the core 208 switches places and becomes the inner ring) or where the evanescent feature with intracavity grating is present on both the inner and outer rings with the core 208 in the middle. Thus, the choice of the grating to be on the high frequency side or low frequency side of the pump resonance is arbitrary, so long as the signal resonance is then shifted to be on the low or high frequency side (opposite grating) accordingly.

Figure 3:
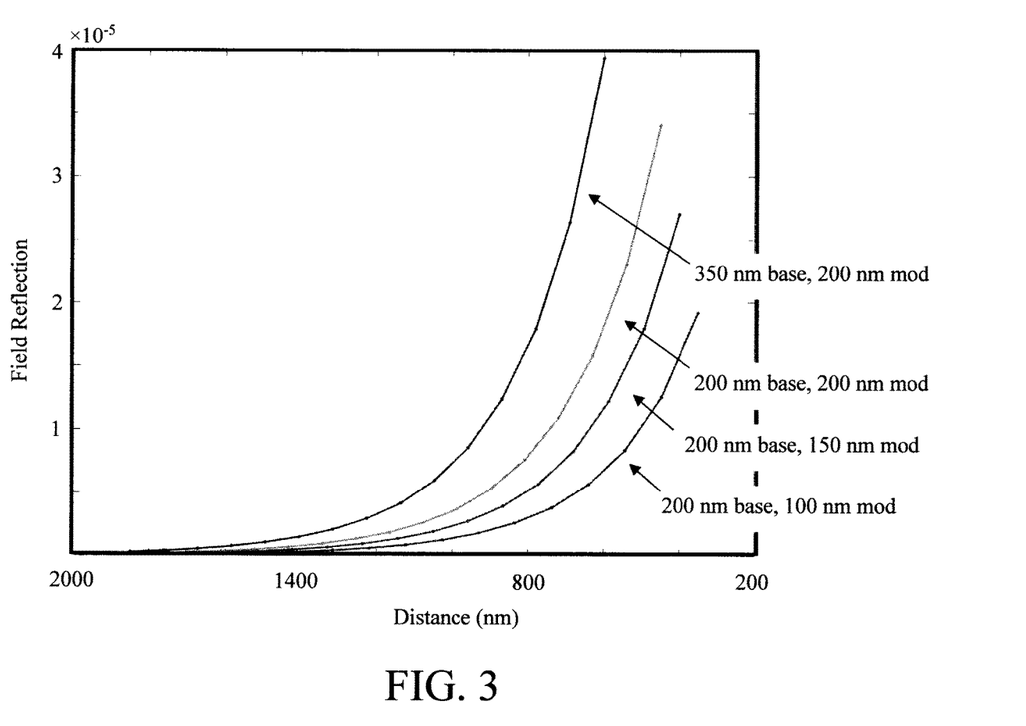
FIG. 3 is a diagram illustrating field reflection as a function of a distance by which the base portion is offset from the core according to an embodiment of the present invention.

The base 210 is offset from the core 208 (see arrow labeled "Distance") such that a gap is present between the evanescent feature (i.e., base portion 210/width modulation portion 212) and the core 208. In this example, core 208 has a width of 1500 nm (see arrow labeled "1500 nm"). See FIG. 2. The 'Distance' the base 210 is offset from the core 208 can be controlled by varying a thickness of the base portion 210 (see arrow labeled "base") and/or a thickness of the width modulation portion 212 (see arrow labeled "modulation"). Doing so, controls the field reflection in the optical ring resonator 102. See FIG. 3. FIG. 3 is a diagram illustrating field reflection as a function of the distance by which the base portion 210 is offset from the core 208 (measured in nanometers (nm)) which varies based on the thickness of the base portion 210 and/or the thickness of the width modulation portion 212 (see FIG. 2).

As shown in FIG. 3, a base portion 210 with a thickness of 200 nm in combination with width modulation (mod) portions 212 of thicknesses of 100 nm, 150 nm and 200 nm showed a respective increase in field reflection. Increasing the thickness of the base portion to 350 nm (effectively reducing the gap between the evanescent feature and the core 208 thus bringing the intracavity grating closer to the core 208) further increases the field reflection. This field reflection is the coupling strength between clockwise and counterclockwise propagating modes in the ring resonator at $f_G$ that produces the desired frequency separation of resonance splitting. As highlighted above, the goal of the intracavity grating is to spoil the blue-side resonance at $f_G$ such that the conversion process from $f_P \rightarrow f_S$ dominates.

Optical ring resonator 102 is a closed loop optical ring resonator which acts as a filter for light of a certain (resonant) wavelength. Referring back to FIG. 2, according to an exemplary embodiment, optical ring resonator 102 includes a bottom electrode 214, a top electrode 216, and bias electrodes 218. For instance, as shown in FIG. 2, Si layers 204"/206", core 208, the evanescent feature (i.e., base portion 210/width modulation portion 212), etc. are all disposed on a first surface of substrate 101, and the bottom electrode 214 is disposed on a second surface of substrate 101, where the first surface of substrate 101 is opposite to the second surface.

Top electrode 216 is disposed on Si layer 206", and the bias electrodes 218 are disposed on substrate 101 on opposite sides of Si layer 204". The electrodes form a transmission line resonator in which there is a standing wave radio frequency (RF) field. As provided above, microwave frequencies generally refer to those RF frequencies of greater than or equal to about 1 GHz. Thus, the transmission line resonator spatially overlaps the RF and optical modes. According to an exemplary embodiment, the Kerr electro-optic effect or DC Kerr effect is used for microwave-to-optical conversion. As known in the art, the DC Kerr effect refers to a change in the refractive index of a material in response to a slowly varying electrical field applied to the sample material. Here, an electric field is applied via the bias electrodes 218 or by back-gating via the bottom electrode 214 through the substrate 101.

Figure 4:
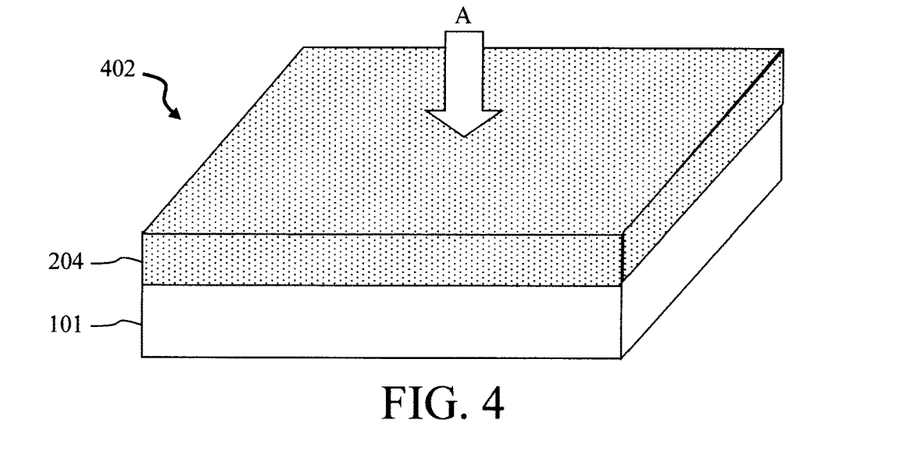
FIG. 4 is a diagram illustrating a (first) Si layer on a low refractive index substrate according to an embodiment of the present invention.

An exemplary methodology for forming microwave-to-optical transducer 100 is now described by way of reference to FIGS. 4-13. According to an exemplary embodiment, the process begins with a structured substrate, such as a SOX substrate 402. See FIG. 4. As shown in FIG. 4, SOX substrate 402 includes a Si layer 204 on a substrate 101, where substrate 101 is formed from a suitable low refractive index material. As provided above, suitable low refractive index materials include, but are not limited to, sapphire, diamond, SiC and/or GaN. Further, in accordance with the SOX substrate configuration, Si layer 204 may also be referred to herein as a SOX layer.

Figure 5:
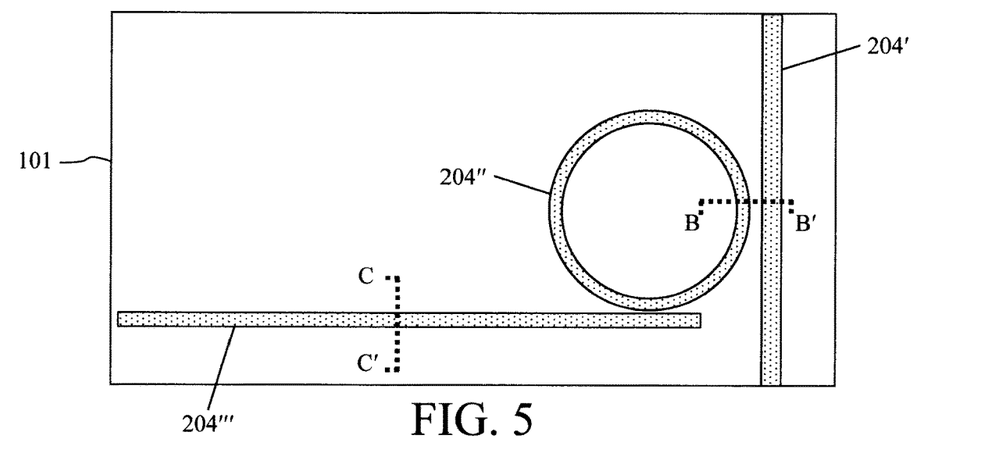
FIG. 5 is a top-down diagram illustrating the first Si layer having been patterned to form patterned portions of the first Si layer in the shape of the optical ring resonator, input pump photon waveguide and microwave signal waveguide on the substrate according to an embodiment of the present invention.
Figure 6:
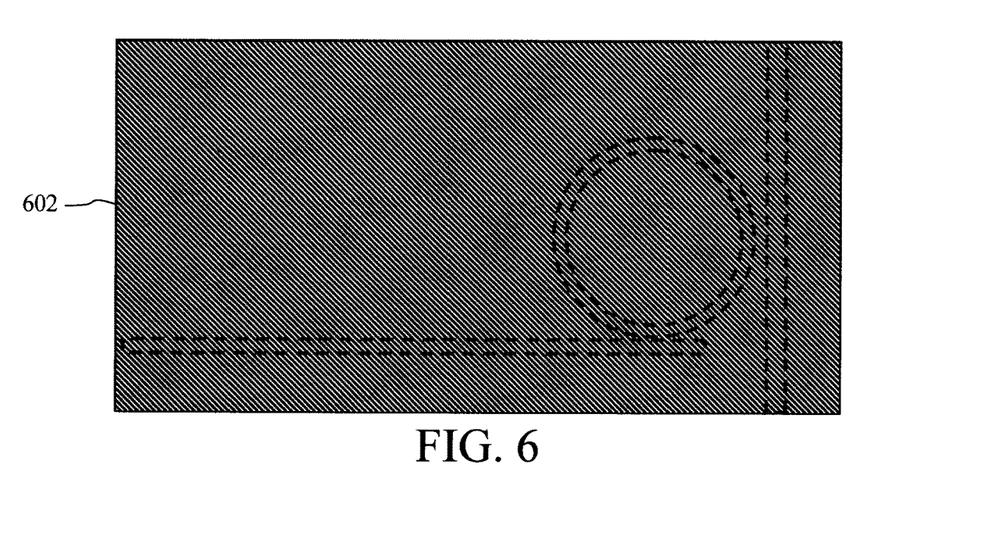
FIG. 6 is a top-down diagram illustrating a layer of high refractive index material having been deposited onto the substrate over the patterned portions of the first Si layer according to an embodiment of the present invention.

Referring to a top-down view from view point A (see FIG. 4), as shown in FIG. 5 standard lithography and etching techniques are then employed to pattern Si layer 204 into the shape of the optical ring resonator 102, input pump photon waveguide 104 and microwave signal waveguide 106 on substrate 101. Following patterning, as shown in FIG. 5, patterned portions of Si layer 204 are now present on substrate 101. These patterned portions correspond to Si layer 204', Si layer 204" and Si layer 204''' in the microwave signal waveguide 106, optical ring resonator 102, and input pump photon waveguide 104, respectively. See FIG. 2, described above. It is notable that the input pump photon waveguide 104 was not depicted in the cross-sectional view of FIG. 2. However, the same convention is being used to designate that Si layer 204''' is patterned from the same Si layer 204 as Si layer 204' and Si layer 204". Further, the designation 'first Si layer' may also be used herein when referring to Si layer 204', Si layer 204" and/or Si layer 204''' so as to distinguish these layers from (second) Si layer 206', Si layer 206" and/or Si layer 206'. See below.

A layer 602 of a material having a refractive index that is higher than the refractive index of Si is then deposited onto the substrate 101 over Si layers 204', 204" and 204'''. See FIG. 6. This layer 602 will be patterned into the core of input pump photon waveguide 104, the core of microwave signal waveguide 106, and the core/evanescent feature of optical ring resonator 102. As provided above, suitable core/evanescent feature materials include, but are not limited to, SiGe.

Figure 7:
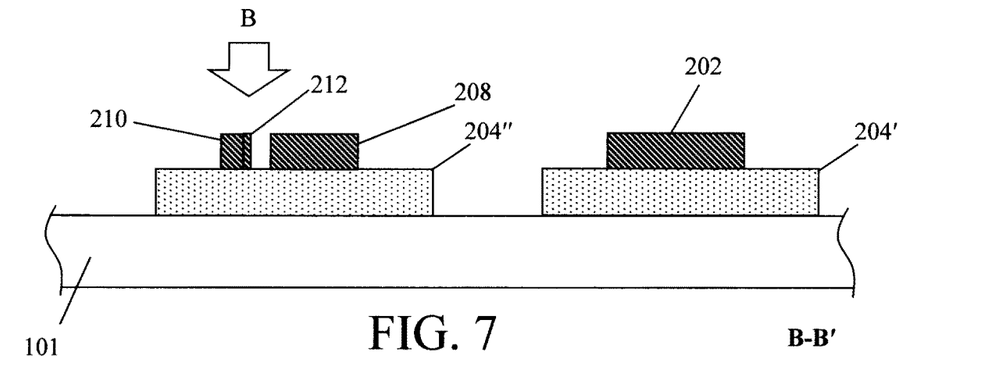
FIG. 7 is a cross-sectional diagram illustrating the layer of high refractive index material having been patterned into a core of the microwave signal waveguide, and the core/evanescent feature of the optical ring resonator according to an embodiment of the present invention.
Figure 8:
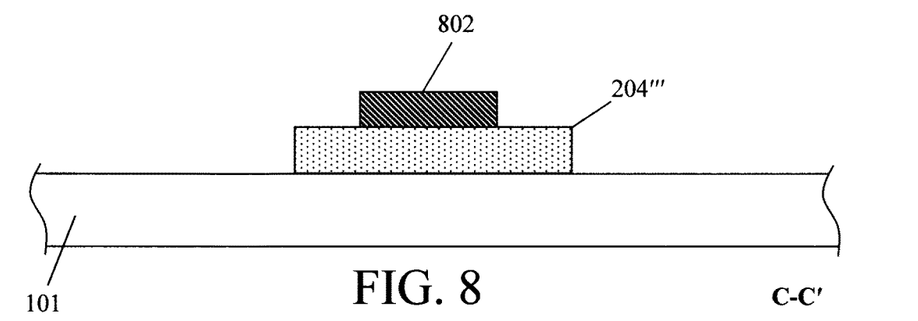
FIG. 8 is a cross-sectional diagram illustrating the layer of high refractive index material having been patterned into a core of the input pump photon waveguide according to an embodiment of the present invention.
Figure 9:
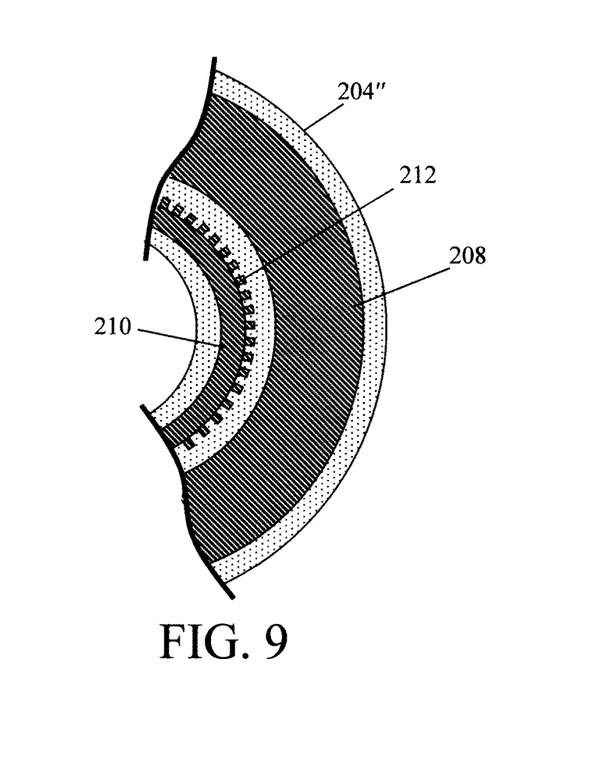
Figure 10:
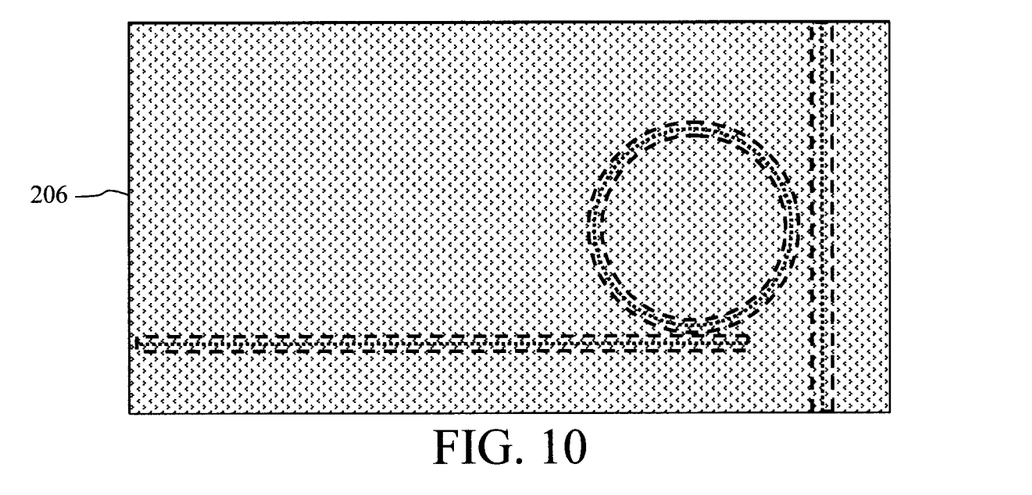
FIG. 10 is a top-down diagram illustrating a second Si layer having been deposited onto the substrate 101 over the core of the microwave signal waveguide, the core/evanescent feature of the optical ring resonator, and the core of the input pump photon waveguide according to an embodiment of the present invention.
Figure 11:
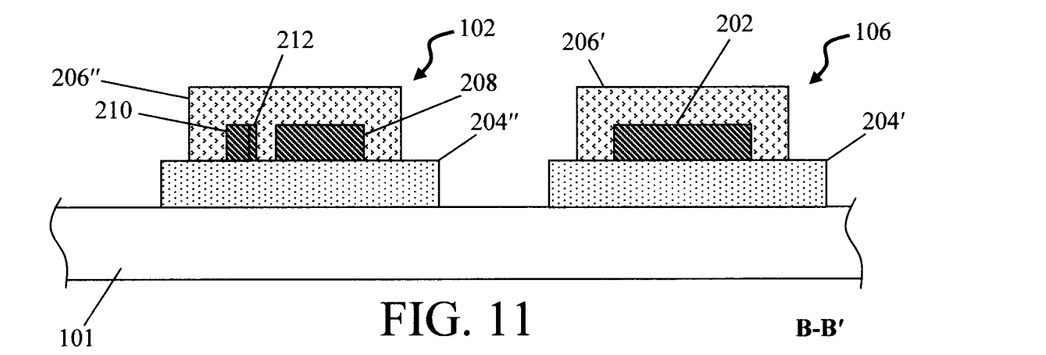
FIG. 11 is a cross-sectional diagram illustrating the second Si layer having been patterned to form patterned portions of the second Si layer that surround the core of the microwave signal waveguide, and the core/evanescent feature of the optical ring resonator according to an embodiment of the present invention.
Figure 12:
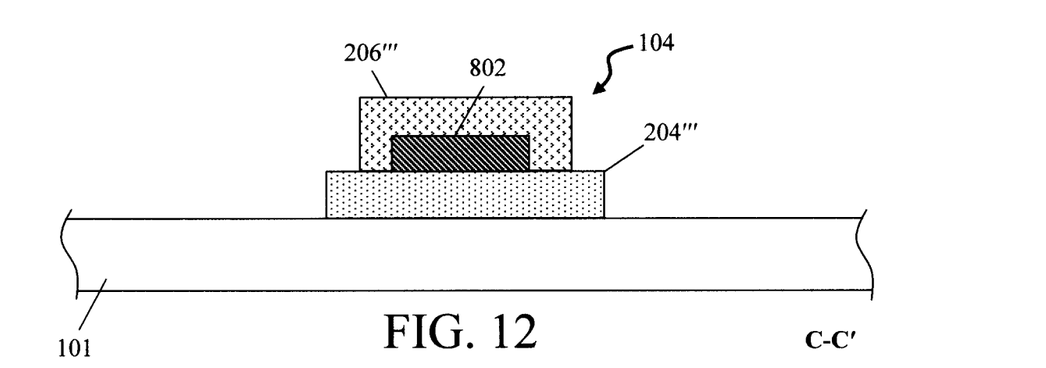
FIG. 12 is a cross-sectional diagram illustrating the second Si layer having been patterned to form patterned portions of the second Si layer that surround the core of the input pump photon waveguide according to an embodiment of the present invention.
Figure 13:
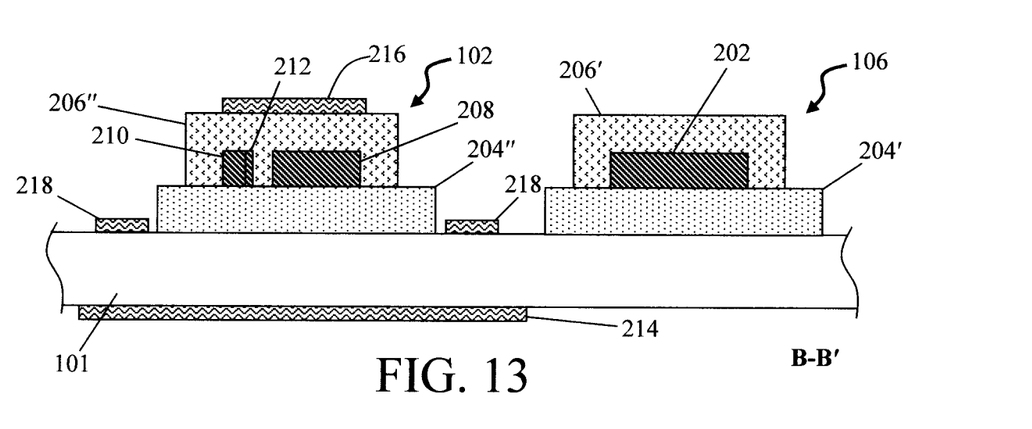
FIG. 13 is a cross-sectional diagram illustrating, for the optical ring resonator, a bottom electrode having been formed on the substrate, a top electrode having been formed on the patterned portion of the second Si layer, and bias electrodes having been formed on the substrate on opposite sides of the patterned portion of the first Si layer according to an embodiment of the present invention.

Standard lithography and etching techniques are next employed to pattern layer 602 into core 202 of microwave signal waveguide 106 and core 208/evanescent feature (i.e., base portion 210/width modulation portion 212) of optical ring resonator 102 (see view B-B' in FIG. 7), and core 802 of input pump photon waveguide 104 (see view C-C' in FIG. 8). The orientation of views B-B' and C-C' are shown in FIG. 5. It is notable that each of these features (i.e., core 202 of microwave signal waveguide 106, core 208/evanescent feature of optical ring resonator 102, and core 802 of input pump photon waveguide 104) is patterned from the same layer 602 (e.g., SiGe).

For instance, regarding optical ring resonator 102, the evanescent feature having base portion 210 and width modulation portion 212 (that forms the intracavity grating) is patterned in the same layer 602 as core 208. Techniques for creating perturbations such as grating in a photonics device are generally described, for example, in U.S. Pat. No. 9,316,787 issued to Orcutt et al., entitled "Continuous Evanescent Perturbation Gratings in a Silicon Photonics Device" (hereinafter "U.S. Pat. No. 9,316,787"), the contents of which are incorporated by reference as if fully set forth herein.

Referring to a top-down view (i.e., from viewpoint B—see FIG. 7) of the optical ring resonator 102, it can be seen that width modulation portion 212 forms the intracavity grating that is continuous along a side of base portion 210 (i.e., inner ring) adjacent to the core 208 (i.e., outer ring). See FIG. 9. In this particular example, the intracavity grating has a sawtooth pattern. However, as described in U.S. Pat. No. 9,316,787, the 90 degree angles in the pattern might be slightly rounded based on the lithography process. Further, a sawtooth pattern is merely one example for creating the intracavity grating. For instance, one might instead employ constant linewidth gratings. See, for example, U.S. Pat. No. 9,316,787.

Next, a second Si layer 206 (where Si layer 204 is the first Si layer) is deposited onto the substrate 101 over cores 202/core 208 (and base portion 210/width modulation portion 212)/core 802 and Si layers 204'/204"/204'''. See the top-down view of FIG. 10. Standard lithography and etching techniques are then employed to pattern Si layer 206 into Si layer 206', Si layer 206" and Si layer 206''' over Si layer 204', Si layer 204" and Si layer 204''' so as to surround core 202 (of microwave signal waveguide 106), core 208/base portion 210/width modulation portion 212 (of optical ring resonator 102) (see view B-B' in FIG. 11) and core 802 (of input pump photon waveguide 104) (see view C-C' in FIG. 12), respectively.

Finally, standard metallization techniques are used to form bottom electrode 214 on substrate 101, top electrode 216 on Si layer 206", and bias electrodes 218 on substrate 101 on opposite sides of Si layer 204". See view B-B' in FIG. 13. In operation as a microwave-optical transducer at cryogenic conditions, superconducting electrodes are typically optimal. Suitable electrode materials include, but are not limited to, aluminum (Al), niobium (Nb), titanium (Ti), and combinations thereof, e.g., alloys such as niobium titanium nitride (NbTiN).

Figure 14:
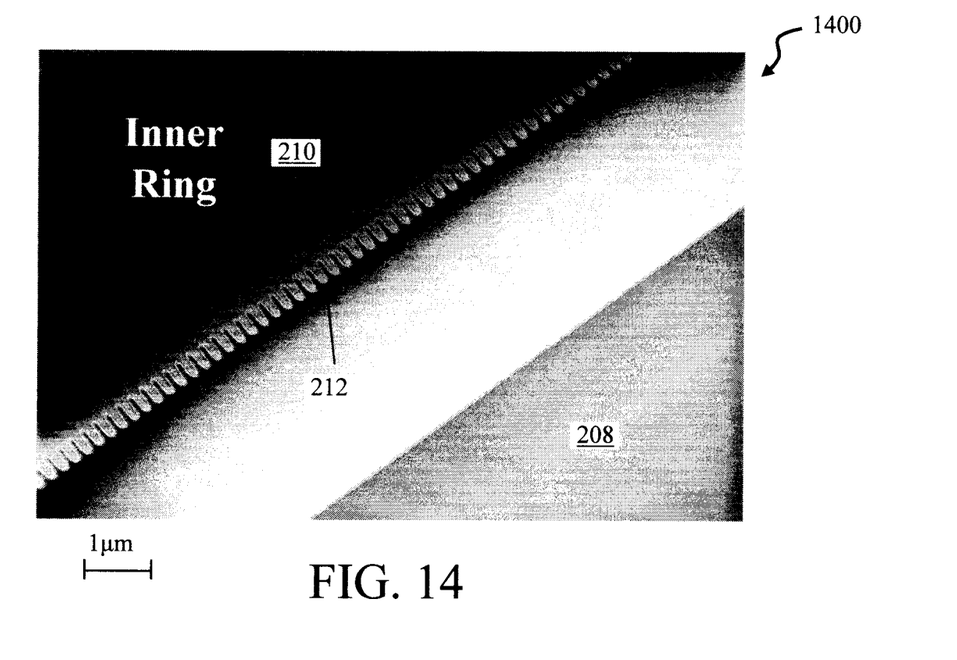
FIG. 14 is an image of the intracavity grating (formed by the width modulation portion) on the 'inner ring' (i.e., the base portion) of the optical ring resonator according to an embodiment of the present invention.

FIG. 14 is an image 1400 of the intracavity grating (formed by width modulation portion 212) on the 'inner ring' (i.e., base portion 210) of optical ring resonator 102. As shown in FIG. 14, the 90 degree angles in the, e.g., sawtooth, pattern can become slightly rounded based on the lithography process.

Figure 15:
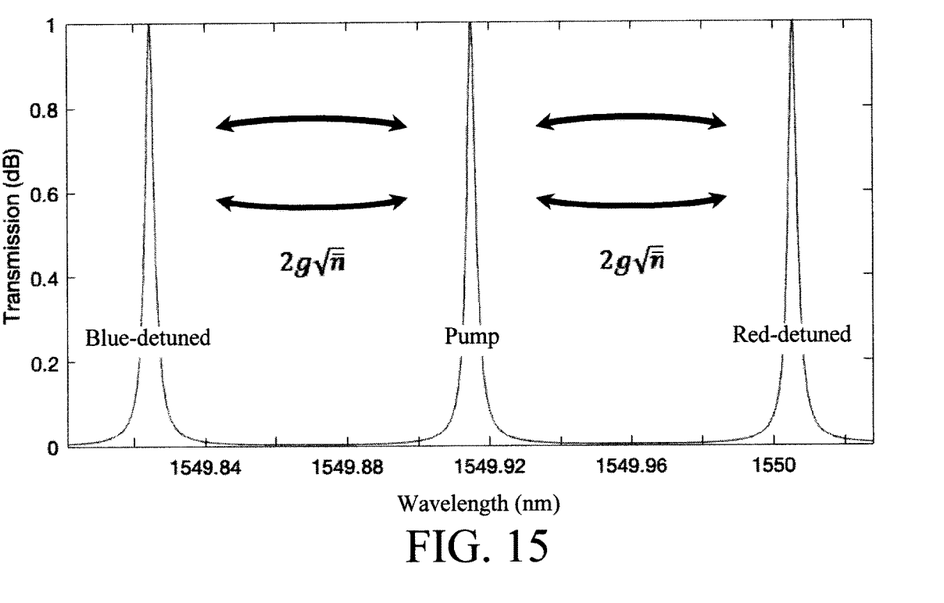
FIG. 15 is a diagram illustrating that with an optical ring resonator there are both blue-detuned and red-detuned resonances to which the pump resonance can couple.

As described in detail above, for a given pump photon frequency $f_P$ there are generally both blue-detuned and red-detuned resonances that could be coupled to. See, for example, FIG. 15. As shown in FIG. 15, with an optical ring resonator there are both blue-detuned and red-detuned resonances to which the pump resonance (central resonance in FIG. 15) can couple. In that case, one will get coupling to both the red and blue neighbor modes.

Figure 16:
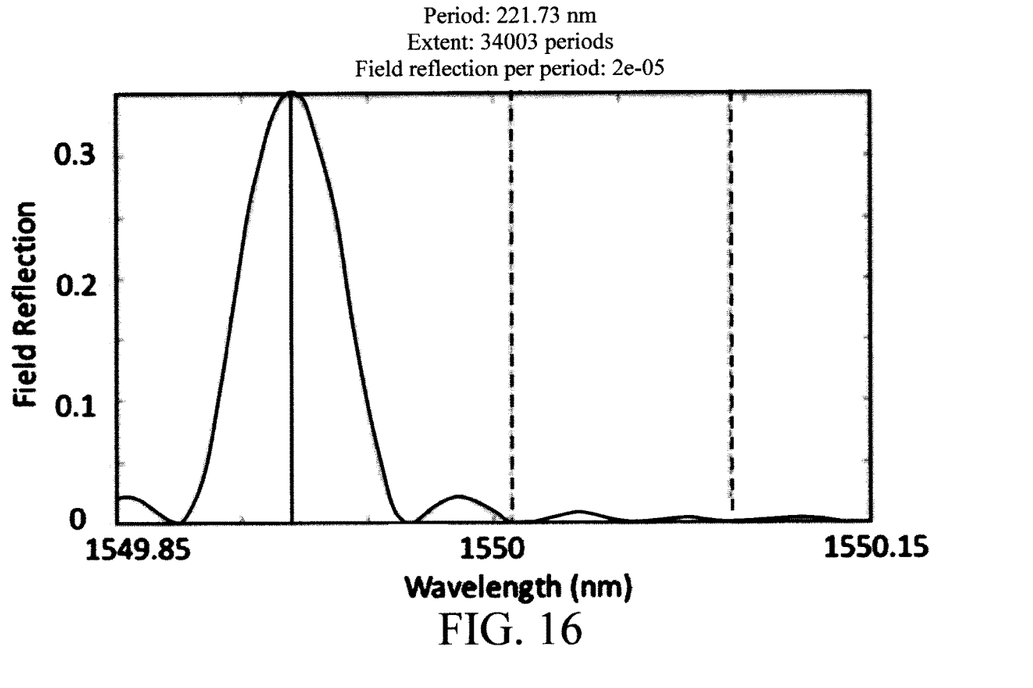
FIG. 16 is a diagram illustrating a field reflection spectrum of the intracavity grating according to an embodiment of the present invention.
Figure 17:
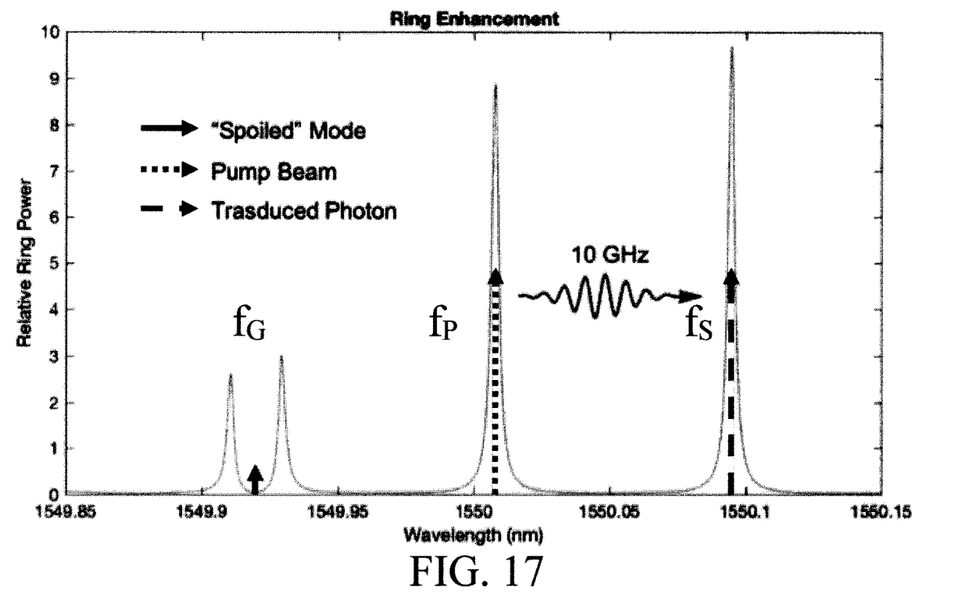
FIG. 17 is a diagram illustrating that in an optical ring resonator there are two adjacent optical resonances relative to the optical pump input photon frequency ($f_P$), i.e., the blue-side resonance at $f_G$ and the red-side resonance at $f_S$, and that intracavity grating spoils the blue neighbor mode at the unused resonance order $f_G$ according to an embodiment of the present invention.

However, in accordance with the present techniques it has been found that the intracavity grating of optical ring resonator 102 can be used to spoil the resonance at the unused resonance order (i.e., the blue neighbor mode) $f_G$ such that the conversion process from optical pump input photon frequency $(f_P)\rightarrow$output signal frequency $(f_S)$ dominates. The field reflection spectrum of the intracavity grating is shown in FIG. 16. As described in conjunction with the description of FIG. 3 above, the field reflection can be tuned by varying the dimensions of the base portion 210 and/or width modulation portion 212 of optical ring resonator 102 to control the coupling strength between clockwise and counterclockwise propagating modes and to thereby control the resonance splitting. As shown in FIG. 17, in optical ring resonator 102 there are two adjacent optical resonances relative to the optical pump input photon frequency $(f_P)$, i.e., the blue-side resonance at $f_G$ and the red-side resonance at $f_S$. However, the intracavity grating spoils the blue neighbor mode at the unused resonance order $f_G$, thereby enabling high conversion efficiency from $(f_P)\rightarrow(f_S)$. FIG. 17 depicts the intracavity field enhancement as this is the relevant parameter to determine conversion efficiency in the transduction process.

Figure 18:
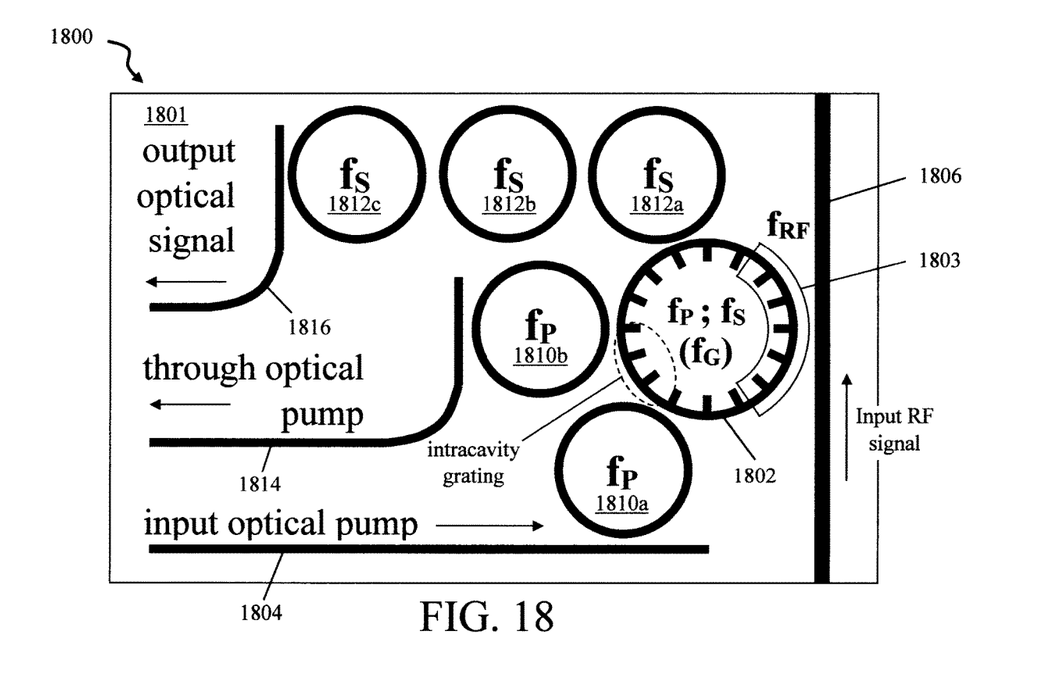
FIG. 18 is a diagram illustrating an exemplary microwave-to-optical transducer having multiple optical ring resonators forming isolated pump and signal paths, and a transduction optical ring resonator with intracavity grating according to an embodiment of the present invention.

In its simplest form, the present microwave-to-optical transducer has a single optical ring resonator. See, for example, microwave-to-optical transducer 100 described above. However, embodiments are also contemplated herein having multiple ring resonators. See, for example, microwave-to-optical transducer 1800 of FIG. 18. As shown in FIG. 18, microwave-to-optical transducer 1800 includes multiple optical ring resonators on a substrate 1801. Specifically, microwave-to-optical transducer 1800 resonantly couples optical pump and signal photons in isolated paths through Vernier-aligned optically-coupled (pump photon) optical ring resonators 1810a,b, and (signal photon) optical ring resonators 1812a,b,c for the pump and signal paths, respectively. The optical free spectral range of optical ring resonator 1802 is matched to the RF frequency (see input RF signal). Thus, optical ring resonator 1802 is also referred to herein as a "transduction resonator." According to an exemplary embodiment, optical ring resonator 1802 is configured the same as optical ring resonator 102 described above. Namely, as shown in FIG. 18, optical ring resonator 1802 has intracavity grating to split the single resonance by spoiling the resonance at the unused resonance order. Techniques for forming an optical ring resonator with intracavity grating on an inner ring (via a base portion and width modulation portion) opposite a core/outer ring were described in detail above. As with optical ring resonator 102, a top electrode 1803 is present over at least a portion of the optical ring resonator 1802. According to an exemplary embodiment, top electrode 1803 has a crescent shape that covers a portion of the optical ring resonator 1802 forming a quarter-wave RF resonator.

In the pump pathway, pump photon optical ring resonator 1810a is optically coupled to an input pump photon waveguide 1804 and pump photon optical ring resonator 1810b is optically coupled to an output pump photon waveguide 1814. Pump photon optical ring resonators 1810a and 1810b are optically coupled to optical ring resonator 1802. The terms "first" and "second" may also be used herein when referring to pump photon optical ring resonators 1810a and 1810b, respectively. As shown in FIG. 18, pump photon waveguide 1804 carries optical pump input photons (at a frequency $f_P$) to pump photon optical ring resonator 1810a. The pump pathway continues through optical ring resonator 1802. A microwave signal waveguide 1806 is optically coupled to optical ring resonator 1802. As shown in FIG. 18, microwave signal waveguide 1806 carries microwave input photons of frequency $f_{RF}$ to the optical ring resonator 1802. Along the pump pathway, the optical pump photons then pass through pump photon optical ring resonator 1810b and out from microwave-to-optical transducer 1800 via output pump photon waveguide 1814.

As provided above, the optical pump photon input signal $(f_P)$ is converted to an output signal at frequency $(f_S)$, wherein $f_S=f_P-f_{RF}$. As shown in FIG. 18, in the signal pathway, signal photon optical ring resonator 1812a is optically coupled to optical ring resonator 1802 and to signal photon optical ring resonator 1812b. Signal photon optical ring resonator 1812b is optically coupled to signal photon optical ring resonator 1812c, which is in turn coupled to an output signal photon waveguide 1816. The terms "first," "second" and "third" may also be used herein when referring to signal photon optical ring resonators 1812a, 182b and 1812c, respectively. Along the signal pathway, the output signal $(f_S)$ passes from optical ring resonator 1802 through signal photon optical ring resonator 1812a, 1812b and 1812c, and out from microwave-to-optical transducer 1800 via output signal photon waveguide 1816.

In the same manner as described above, according to an exemplary embodiment optical ring resonator 1802, pump photon optical ring resonators 1810a,b, signal photon optical ring resonators 1812a,b,c, input pump photon waveguide 1804, microwave signal waveguide 1806, output pump photon waveguide 1814 and output signal photon waveguide 1816 each includes a core formed from a first material (e.g., SiGe) that is surrounded by a second/different material of a lower refractive index (e.g., Si), and can be formed on a low refractive index substrate (e.g., sapphire, diamond, SiC and/or GaN). For the optical ring resonator 1802, an evanescent feature having width modulation to form the intracavity grating is patterned in the same layer as the core. While FIGS. 4-13 (described above) depict the formation of a microwave-to-optical transducer design having a single optical ring resonator, one of skill in the art would appreciate that those same techniques can be applied in the same manner described to form multiple optical ring resonators and input/output waveguides.

Figure 19:
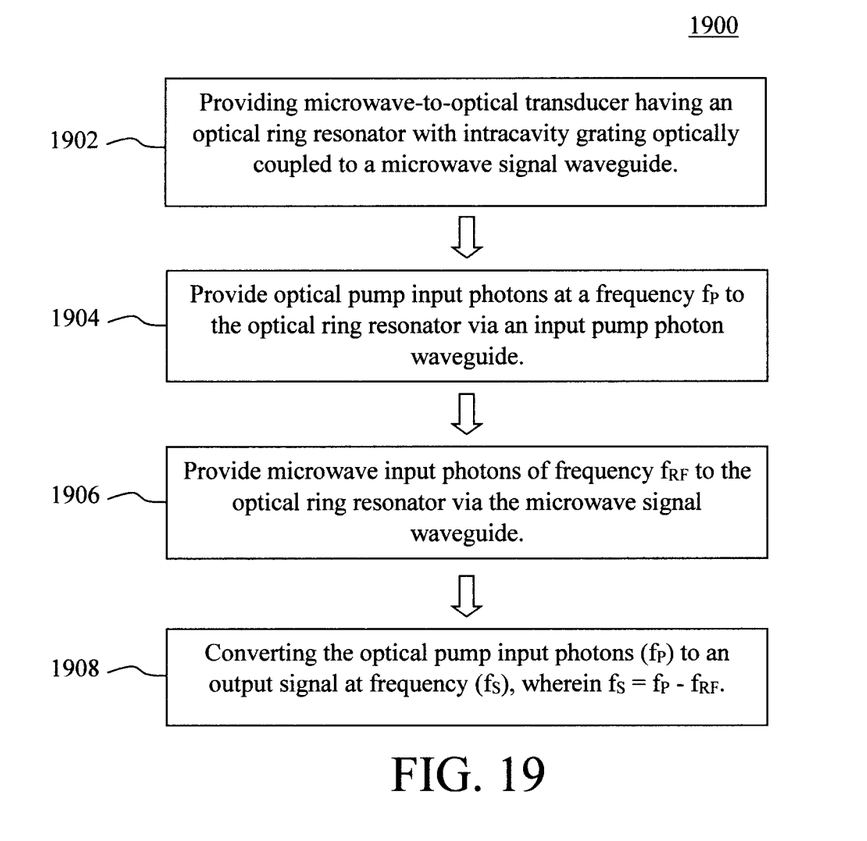
FIG. 19 is a diagram illustrating an exemplary methodology for microwave-optical transduction according to an embodiment of the present invention.

FIG. 19 is a diagram illustrating an exemplary methodology 1900 for microwave-optical transduction. In step 1902, a microwave-to-optical transducer is provided having an optical ring resonator with intracavity grating optically coupled to a microwave signal waveguide. For instance, in one exemplary embodiment, methodology 1900 is performed using microwave-to-optical transducer 100 (of FIG. 1) having a single optical ring resonator 102. Alternatively, in another exemplary embodiment, methodology 1900 is performed using microwave-to-optical transducer 1800 (of FIG. 18) having multiple optical ring resonators forming isolated pump and signal paths optically coupled to optical ring resonator 1802. Regardless of which transducer design is employed, the transduction resonator (i.e., optical ring resonator 102 or optical ring resonator 1802) has an evanescent feature with width modulation to form the intracavity grating that is patterned in the same layer as the core (see above).

In step 1904, optical pump photons at a frequency $f_P$ are provided to the optical ring resonator via an input pump photon waveguide. For instance, in one exemplary embodiment, methodology 1900 is performed using microwave-to-optical transducer 100 (of FIG. 1) whereby input pump photon waveguide 104 is optically coupled directly to optical ring resonator 102. In that case, the pump pathway of the optical pump photons is through input pump photon waveguide 104 to optical ring resonator 102. Alternatively, in another exemplary embodiment, methodology 1900 is performed using microwave-to-optical transducer 1800 (of FIG. 18) having isolated pump and signal paths optically coupled to optical ring resonator 1802. In that case, the pump pathway of the optical pump photons is via an isolated pump pathway through input pump photon waveguide 1804 and pump photon optical ring resonator 1810a to optical ring resonator 1802. The optical pump photons exiting optical ring resonator 1802 pass through photon optical ring resonator 1810b and output pump photon waveguide 1814.

As provided above, for a given pump photon frequency $f_P$ there are generally two (i.e., blue-detuned and red-detuned) optical resonances relative to the optical pump input photon frequency ($f_P$) that the optical pump photons could be coupled to, which decreases conversion efficiency. However, the intracavity grating in the optical ring resonator (i.e., optical ring resonator 102 or 1802) spoils one of the optical resonances, i.e., the blue neighbor mode at the unused resonance order $f_c$, thereby enabling high conversion efficiency from $(f_P) \rightarrow (f_S)$.

In step 1906, microwave input photons of frequency $f_{RF}$ are provided to the optical ring resonator via the microwave signal waveguide. For instance, in one exemplary embodiment, methodology 1900 is performed using microwave-to-optical transducer 100 (of FIG. 1) and the microwave input photons are provided to optical ring resonator 102 via microwave signal waveguide 106. Alternatively, in another exemplary embodiment, methodology 1900 is performed using microwave-to-optical transducer 1800 (of FIG. 18) and the microwave input photons are provided to optical ring resonator 102 via microwave signal waveguide 106.

In step 1908, using the microwave input photons of frequency $f_R r$, the optical pump photons at frequency $f_P$ are converted to an output signal at frequency $f_S$, wherein $f_S = f_P - f_{RF}$. In the case of microwave-to-optical transducer 1800, the output signal at frequency ($f_S$) is then extracted via an isolated signal pathway through signal photon optical ring resonator 1812a, 1812b and 1812c, and out from microwave-to-optical transducer 1800 via output signal photon waveguide 1816.

It is notable that pump photon pathways optical ring resonators 1810a/1810b that couple optical ring resonator 1802 are resonant at $f_P$ and the signal pathway optical ring resonators 1812a, 1812b, and 1812c that couple optical ring resonator 1802 are resonant at $f_S$ thus separating the pump versus signal pathways. As shown in FIG. 18, the pump photon pathways optical ring resonators 1810a/1810b and the signal pathway optical ring resonators 1812a, 1812b, and 1812c have different radii than optical ring resonator 1802, and therefore do not have the same free spectral range and only have overlapping resonances at the desired frequencies. The photons will therefore travel on the unique frequency paths in and out of the optical ring resonator 1802.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A microwave-to-optical transducer, comprising:
  an optical ring resonator with an intracavity grating comprising a core and an evanescent feature adjacent to the core;
  an input pump photon waveguide for carrying optical input photons towards the optical ring resonator with the intracavity grating; and
  a microwave signal waveguide for carrying microwave input photons towards the optical ring resonator with the intracavity grating.

2. The microwave-to-optical transducer of claim 1, wherein the evanescent feature comprises:
  a base portion; and
  a width modulation portion having a width that modulates continuously along a surface of the base portion facing the core to form the intracavity grating.

3. The microwave-to-optical transducer of claim 2, wherein the intracavity grating has a sawtooth pattern.

4. The microwave-to-optical transducer of claim 2, wherein the core and the evanescent feature are surrounded by a cladding material.

5. The microwave-to-optical transducer of claim 4, wherein the core and the evanescent feature comprise silicon germanium (SiGe), and wherein the cladding material comprises silicon (Si).

6. The microwave-to-optical transducer of claim 1, wherein the optical ring resonator with the intracavity grating and the microwave signal waveguide are formed on a substrate comprising a material selected from the group consisting of: sapphire, diamond, silicon carbide (SiC), gallium nitride (GaN), and combinations thereof.

7. The microwave-to-optical transducer of claim 1, further comprising:
  multiple pump photon optical ring resonators optically coupled to the optical ring resonator with the intracavity grating forming an isolated pump photon pathway; and
  multiple signal photon optical ring resonators optically coupled to the optical ring resonator with the intracavity grating forming an isolated signal photon pathway.

8. The microwave-to-optical transducer of claim 7, further comprising:
  an output pump photon waveguide;
  a first pump photon optical ring resonator optically coupled to the input pump photon waveguide and to the optical ring resonator with the intracavity grating; and
  a second pump photon optical ring resonator optically coupled to the output pump photon waveguide and to the optical ring resonator with the intracavity grating.

9. The microwave-to-optical transducer of claim 7, further comprising:
  an output signal photon waveguide;
  a first signal photon optical ring resonator optically coupled to the optical ring resonator with the intracavity grating;

a second signal photon optical ring resonator optically coupled to the first signal photon optical ring resonator; and a third signal photon optical ring resonator optically coupled to the second signal photon optical ring resonator and to the output signal photon waveguide.

10. A microwave-to-optical transducer, comprising:

an optical ring resonator with an intracavity grating comprising a core, and an evanescent feature adjacent to the core;

an input pump photon waveguide for carrying optical input photons towards the optical ring resonator with the intracavity grating;

a microwave signal waveguide for carrying microwave input photons towards the optical ring resonator with the intracavity grating;

multiple pump photon optical ring resonators optically coupled to the optical ring resonator with the intracavity grating forming an isolated pump photon pathway; and multiple signal photon optical ring resonators optically coupled to the optical ring resonator with the intracavity grating forming an isolated signal photon pathway.

11. The microwave-to-optical transducer of claim 10, wherein the evanescent feature comprises:

a base portion; and a width modulation portion having a width that modulates continuously along a surface of the base portion facing the core to form the intracavity grating.

12. The microwave-to-optical transducer of claim 10, wherein the core and the evanescent feature are surrounded by a cladding material.

13. The microwave-to-optical transducer of claim 12, wherein the core and the evanescent feature comprise SiGe, and wherein the cladding material comprises Si.

14. The microwave-to-optical transducer of claim 10, wherein the optical ring resonator with the intracavity grating, the microwave signal waveguide, the multiple pump photon optical ring resonators, and the multiple signal photon optical ring resonators are formed on a substrate comprising a material selected from the group consisting of: sapphire, diamond, SiC, GaN, and combinations thereof.

15. The microwave-to-optical transducer of claim 10, further comprising:

an output pump photon waveguide;

a first pump photon optical ring resonator optically coupled to the input pump photon waveguide and to the optical ring resonator with the intracavity grating; and a second pump photon optical ring resonator optically coupled to the output pump photon waveguide and to the optical ring resonator with the intracavity grating.

16. The microwave-to-optical transducer of claim 10, further comprising:

an output signal photon waveguide;

a first signal photon optical ring resonator optically coupled to the optical ring resonator with the intracavity grating;

a second signal photon optical ring resonator optically coupled to the first signal photon optical ring resonator; and a third signal photon optical ring resonator optically coupled to the second signal photon optical ring resonator and to the output signal photon waveguide.

* * * * *